United States Patent [19]
Tew

[11] Patent Number: 5,455,602
[45] Date of Patent: Oct. 3, 1995

[54] COMBINED MODULATION SCHEMES FOR SPATIAL LIGHT MODULATORS

[75] Inventor: Claudae E. Tew, Dallas, Tex.

[73] Assignee: Texas Instruments Incorporated, Dallas, Tex.

[21] Appl. No.: 38,392

[22] Filed: Mar. 29, 1993

[51] Int. Cl.$^6$ ................................................ H01N 1/21
[52] U.S. Cl. ............................................................ 347/239
[58] Field of Search ................................ 346/108, 76 L, 346/1.1, 160, 107 R; 345/84, 94

[56] References Cited

U.S. PATENT DOCUMENTS

| | | |
|---|---|---|
| 4,054,797 | 10/1977 | Milton et al. |
| 4,638,309 | 1/1987 | Ott ........................................... 345/89 |
| 5,132,773 | 7/1992 | Gelbart . |
| 5,280,280 | 1/1994 | Hotto ........................................ 345/94 |
| 5,357,273 | 10/1994 | Curry ....................................... 346/108 |

*Primary Examiner*—Mark J. Reinhart
*Attorney, Agent, or Firm*—Julie L. Reed; James C. Kesterson; Richard L. Donaldson

[57] ABSTRACT

A method for gray scale printing combining pulse width modulation and time delay and integration. The data for each printed row is pulse width modulated on a predetermined modulator row. The printed row data is then shifted to the next row on the modulator in the process direction after the completion of all bits of pulse width modulation.

7 Claims, 3 Drawing Sheets

COMBINED MODULATION SCHEMES FOR SPATIAL LIGHT MODULATORS

BACKGROUND OF THE INVENTION

This application is being concurrently filed with the following applications: "Process and Architecture for Digital Micromirror Printer," Ser. No. 08/038,398, TI-17632; and "Gray Scale Printing Using Spatial Light Modulator," Ser. No. 08/038,391, TI-17611.

1. Field of the invention

This invention relates to printing systems, more particularly with printing systems using spatial light modulator arrays.

2. Background of the invention

Printing systems trying to achieve gray scale can use spatial light modulators in several ways. The arrays usually have to be defined to a specific dimension, making each type of printing application require a different device. Desktop electrophotographic printing using highly sensitive media, at 600 dots-per-inch (dpi), needs one configuration of a device or devices, whereas a computer to plate offset system using relatively insensitive media needs another. This translates into high cost, low volume production runs. Yet, the needs of different systems must be met.

The computer to plate systems need large arrays that can time delay and integrate (TDI). The image data for one line on the board passes from line to line on the device, keeping the image data for that line on the board the entire time the board is under the device. This gives high energy transfer onto the photosensitive media, which does not have very high sensitivity. A typical array for this application may have as many as 256 rows. This appears satisfactory for printing, allowing 256 gray shades.

However, desktop printing has a different problem. Because of the curvature and movement of the drum, it is nearly impossible to optically "wrap" a 256-row device around it. Yet, 256 rows of gray scale gives printing system users what they need. Therefore, some way must be developed to allow a smaller device to achieve gray scale, and still make those same devices compatible with systems that have different needs.

SUMMARY OF THE INVENTION

The present invention disclosed herein comprises a method to combine pulse width modulation with time delay and integration (TDI) techniques that increase the number of gray scale available for gray scale printing. The invention allows using a smaller device to produce many shades of gray, allowing the devices to be used in tandem for other printing applications.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1A:
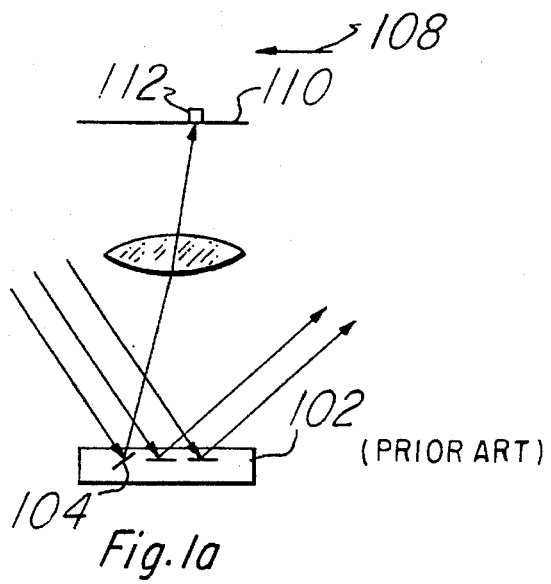
FIGS. 1a–1c show a prior art method of Time Delay and Integration in computer to plate offset printing.
Figure 1B:
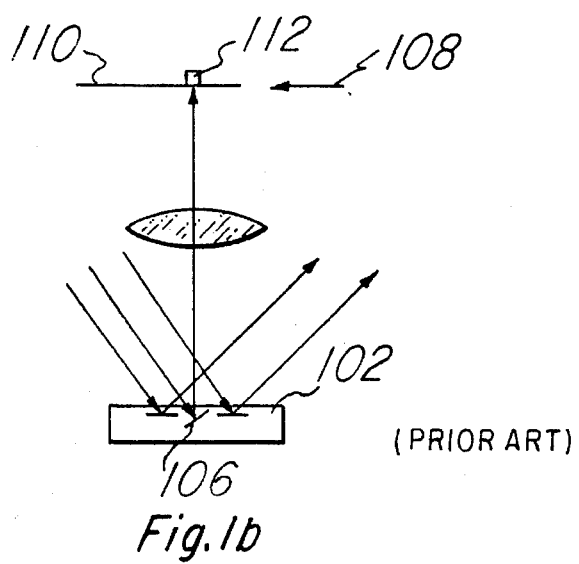
Figure 1C:
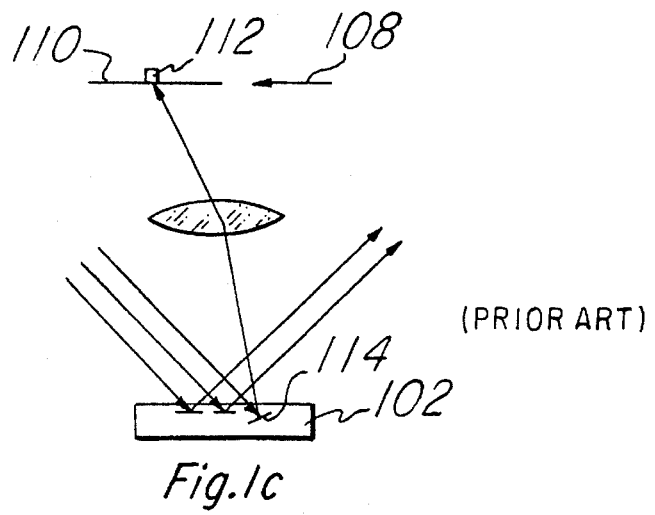

FIGS. 1a–1c show a prior art example of Time Delay and Integration (TDI) in computer to plate offset printing. The light rays impinge upon spatial light modulator 102. One cell shown in row 104 is activated, in this case shown as being deflected. Some examples of such modulators are Digital Micromirror Devices (DMD), Liquid Crystal Devices (LCD), and magneto-optic modulators. For discussion purposes only, the modulator shown is assumed to be a DMD, comprising an array of individual mirrors that are deflectable such as is shown in FIG. 1a.

The light ray impinging upon deflected element 104 passes through the lens and strikes the plate 110 at spot 112. The plate is moving in the direction shown by arrow 108. In FIG. 1b, an element in row 106 is deflected and the light passes through the lens and strikes the same spot 112 on the plate 110. The movement of the data from row 104 to 106 between FIGS. 1a and 1b is coordinated with the movement of the plate 110 in the process, so the same data on row 104 in FIG. 1a is now on row 106 in FIG. 1b.

FIG. 1c shows another step in the process. The data that had been in row 106 in FIG. 1b is now at row 114 in FIG. 1c. The deflected element passes the light through the lens and again strikes the spot 112 on plate 110. This allows multiple time exposures of the same spot on the plate as it passes by the modulator, or as the modulator passes by the plate.

Figure 2A:
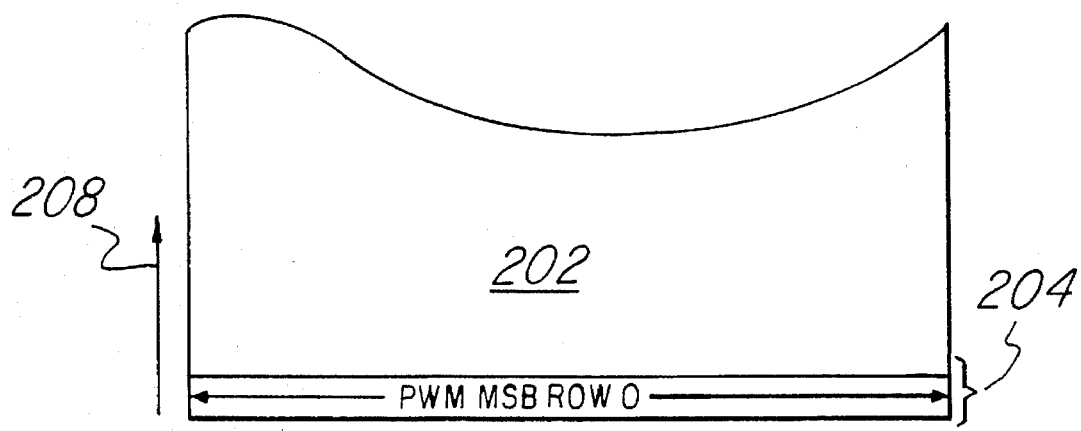
FIGS. 2a–2c show a spatial light modulator array performing pulse width modulation and TDI at the beginning of a page.
Figure 2B:
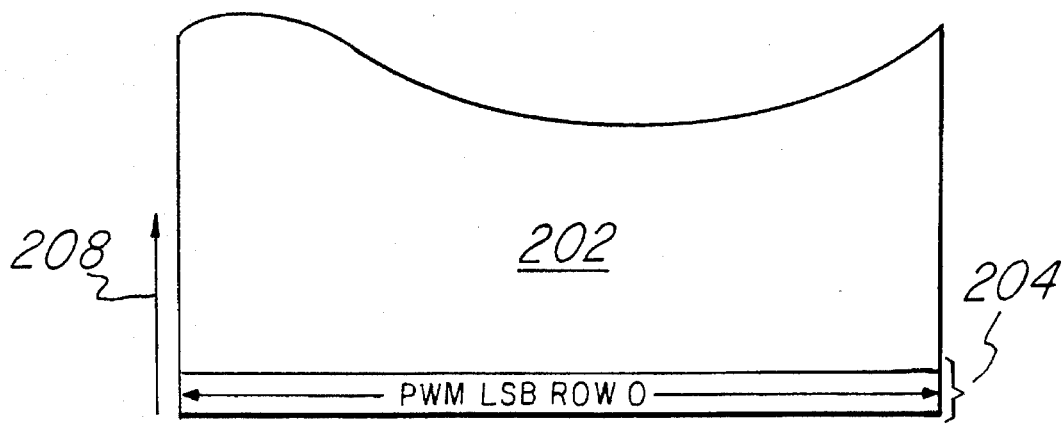
Figure 2C:
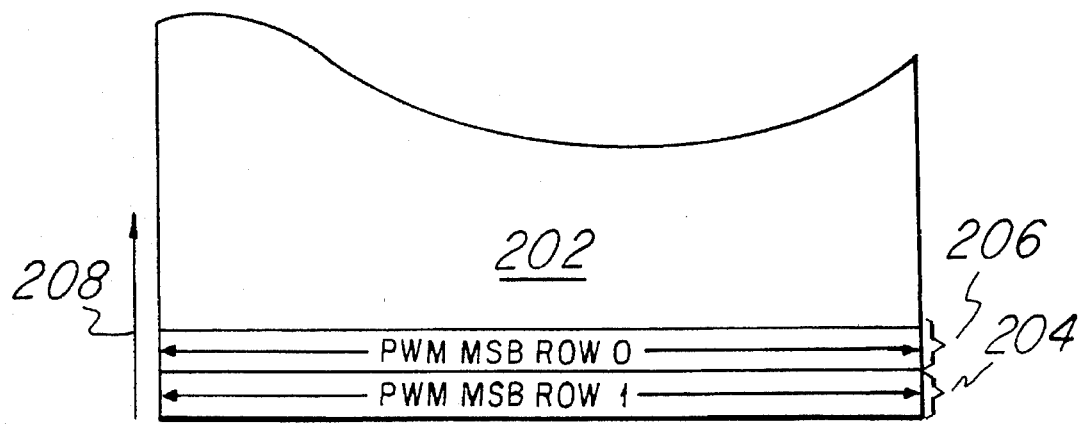

FIGS. 2a–2c show a method that achieves a larger number of gray shades than simple time delay and integration (TDI). The printing process moves in the direction of arrow 208. The face of spatial light modulator is being viewed from what is seen as the vertical edge next to modulator row 104 in FIGS. 1a–1c.

The modulator selected must have a relatively fast response time. For 600 dots-per-inch (dpi), the modulator has to load and display its data quickly. For example, assume a printer that prints 40 pages per minute, allowing 440 inches per minute, or 7.3 inches per sec. At 600 dpi, one inch has 600 pixels, requiring the modulator to print 4400 pixels per sec. For discussion purposes, the device configuration is assumed to be 2600 columns and 128 rows (600 dpi×8.5" equals 5100 columns of pixels, so there are two devices of 2600 columns each). Worst case would be if the entire device 2600×128, or 332,800 pixels would have to be loaded at once. Printing 440 pixels per sec ×332,800, results in a 1.46 GHz data rate, a very difficult rate to achieve.

However, if the modulator were divided up into blocks, where each block loads its own data, the data rate can be reduced dramatically. For instance, if the data rate upper bandwidth was set at 25 MHz, which is an easily managed data rate, the modulator would be divided into 58 blocks. The number of frames per page equals 600 dots/inch×11.5 inch/page, or 6900 frames/page, and 6900 frames/page× pages/sec equals the frames per second. A highly competitive page rate would be 40 pages per minute, or 40/60 pages/sec. This results in a frame rate of 4600 frames per second. The resulting frame time equals 217 μsecs per frame.

A least significant bit (LSB) time of 217 μsecs means that with no pulse-width modulation, the device would have to be loaded in 217 μsecs. To perform PWM, where the bits are displayed for a time slice proportional to their significance, the LSB time would be divided by the number of bits of PWM. For example, if 2 bits of PWM is desired, the LSB time becomes 217 μsecs/2, or 108 μsecs. For faster modulators, this time presents no significant problems with loading the device. A 2 system by 128 TDI would provide 256 shades of gray.

In FIG. 2a, the modulator is shown at the very beginning of the cycle. The first row encountered in the process direction 208 displays the data for the most significant bit (MSB) for Row 0 of the printed image. In FIG. 2b, row 204 on the modulator displays the LSB for the same row. Data line 0 then moves to the next row on the modulator in FIG. 2c. The MSB for Row 0 is now on modulator row 206, and the MSB for Row 1 is on modulator row 204. This process continues up the device. Note that in this case there is no optical reversion as in FIGS. 1a–1c.

Figure 3:
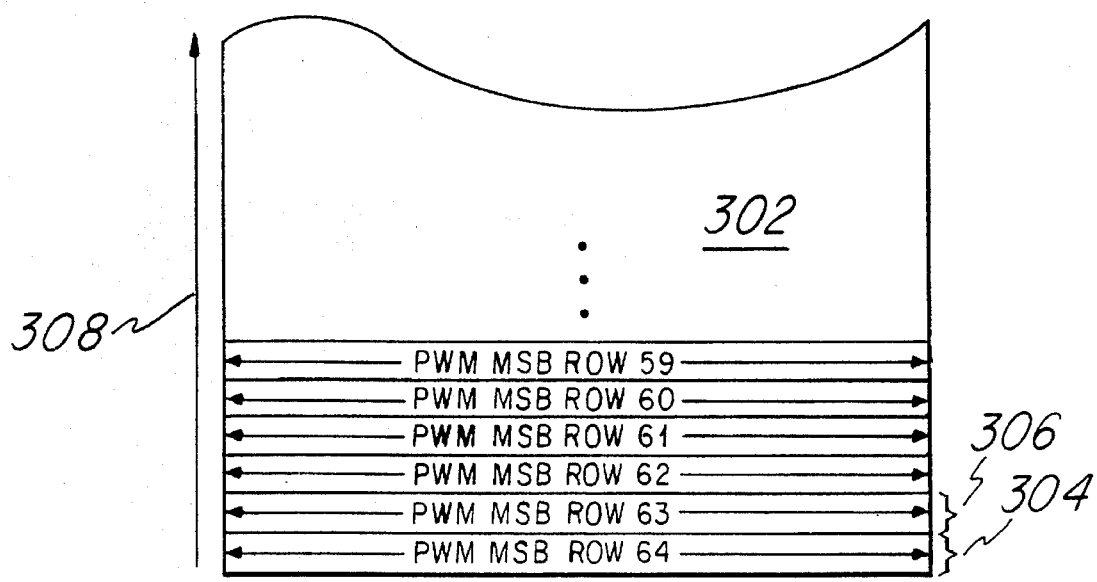
FIG. 3 shows a spatial light modulator array performing pulse width modulation and TDI in the middle of a page.

FIG. 3 shows an example later in time on a portion of modulator 302. The process still moves in direction of the arrow 308. Modulator row 306 is now modulating the data for the MSB of Row 63, and row 304 of the modulator displays the MSB of Row 64. The rest of the modulator s 128 rows would have the bottom 64 rows displaying Rows' 1–64 data onto the drum.

It is a distinct advantage of this method that it allows higher levels of gray than previously achievable. In no way are these levels restricted to monochrome applications. It can be utilized in color systems. Examples of systems that can use this method are offset printing plate, photographic film printers, photographic paper printers, and systems using a xerographic engine, such as fax machines, desktop printers, and copiers.

Figure 4:
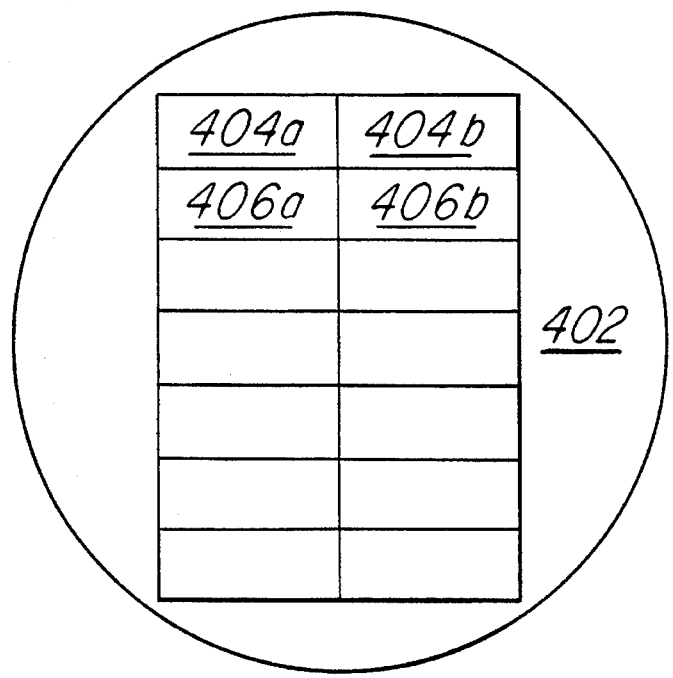
FIG. 4 shows a wafer with spatial light modulator arrays before they are separated into individual chips.

Another advantage besides the increase of available gray scale is the ability to utilize more devices from the manufacturing process. FIG. 4 shows an illustration of this advantage at the wafer level. The wafer 402 has a set of modulators that are essentially finished except for the final dicing of the wafer. The modulators would be tested while on the wafer. If for example, modulators 404a and 406a both tested correctly, they could be left connected together and used in the PCB system, which requires high energy transfer. The two would essentially become a 2600×256 modulator array, in an embodiment where the modulators were 2600×128.

However, if the modulator 406a tested poorly, and modulator 404b tested correctly, then modulators 404a and 404b would remain linked and go into a 600 dpi printing system. They would function as a 5200×128 array. They can still compete in the gray scale area because of the above technique, requiring fewer lines of a modulator for 256 shades of gray. In the above situation, where 406a is a inoperative modulator, and 404a and 404b stay linked for printing, modulator 406b appears to go to waste. However, because of the above techniques, it can still achieve 256 shades of gray, but at 300 dpi. The single modulators can be used in lower-end printing systems.

Thus, although there has been described to this point particular embodiments of gray scale printing it is not intended that such specific references be considered as limitations upon the scope of this invention except in-so-far as set forth in the following claims.

What is claimed is:

1. A method of gray scale printing using a modulator consisting of an array of individual elements formed into rows, comprising:
   a. pulse width modulating data within each row of a modulator;
   b. row integrating said pulse width modulated data from row to row on the modulator, such that the data for any given line to be printed in gray scale travels along the modulator in synchronization with movement of a surface to be printed; and
   c. imaging said data onto a photosensitive surface, wherein said row integration and pulse width modulation determine the amount of exposure any given line receives on said surface, thereby determining the gray scale of said line.

2. The method of claim 1 wherein said pulse width modulation is performed on a digital micromirror device.

3. The method of claim 1 wherein said pulse width modulation is performed on a liquid crystal device.

4. The method of claim 1 wherein said photosensitive surface is a drum in a xerographic printer.

5. The method of claim 1 wherein said photosensitive surface is an offset printing plate.

6. The method of claim 1 wherein said photosensitive surface is photographic film.

7. The method of claim 1 wherein said photosensitive surface is photographic paper.

* * * * *